US007860942B2

(12) United States Patent
Robb et al.

(10) Patent No.: US 7,860,942 B2
(45) Date of Patent: Dec. 28, 2010

(54) METHOD AND SYSTEM FOR PRESENTING DATA OVER A NETWORK BASED ON NETWORK USER CHOICES AND COLLECTING REAL-TIME DATA RELATED TO SAID CHOICES

(75) Inventors: Ian N. Robb, San Diego, CA (US); Michael B. Madlener, Aliso Viejo, CA (US); Ken J. McGuire, Carlsbad, CA (US)

(73) Assignee: Treehouse Solutions, Inc., Long Beach, CA (US)

(*) Notice: Subject to any disclaimer, the term of this patent is extended or adjusted under 35 U.S.C. 154(b) by 1344 days.

(21) Appl. No.: 11/186,723

(22) Filed: Jul. 20, 2005

(65) Prior Publication Data

US 2005/0273722 A1 Dec. 8, 2005

Related U.S. Application Data

(63) Continuation of application No. 09/614,572, filed on Jul. 12, 2000, now Pat. No. 6,952,716.

(51) Int. Cl.
*G06F 15/16* (2006.01)
*G06F 3/048* (2006.01)

(52) U.S. Cl. ....................... 709/217; 715/706; 345/473; 345/474

(58) Field of Classification Search ................. 709/205, 709/217; 705/26, 16, 27; 707/5; 715/852, 715/764, 706; 703/2; 345/473, 474
See application file for complete search history.

(56) References Cited

U.S. PATENT DOCUMENTS

| | | | | |
|---|---|---|---|---|
| 5,707,288 | A | 1/1998 | Stephens | 463/33 |
| 6,100,881 | A | 8/2000 | Gibbons et al. | 345/302 |
| 6,448,980 | B1 | 9/2002 | Kumar et al. | 345/745 |
| 6,519,572 | B1 * | 2/2003 | Riordan et al. | 705/16 |
| 6,539,429 | B2 | 3/2003 | Rakavy et al. | 709/224 |
| 6,545,682 | B1 | 4/2003 | Ventrella et al. | 345/473 |
| 6,577,998 | B1 | 6/2003 | Yamamoto | 704/270 |
| 6,600,725 | B1 | 7/2003 | Roy | 370/261 |
| 6,634,949 | B1 | 10/2003 | Briggs et al. | 463/42 |
| 6,727,925 | B1 * | 4/2004 | Bourdelais | 715/852 |
| 6,732,146 | B1 | 5/2004 | Miyake | 709/204 |
| 6,901,379 | B1 * | 5/2005 | Balter et al. | 705/27 |
| 6,952,716 | B1 * | 10/2005 | Robb et al. | 709/205 |
| 7,080,070 | B1 * | 7/2006 | Gavarini | 707/5 |
| 7,149,665 | B2 * | 12/2006 | Feld et al. | 703/2 |
| 7,346,543 | B1 * | 3/2008 | Edmark | 705/26 |
| 7,526,440 | B2 * | 4/2009 | Walker et al. | 705/26 |
| 2002/0169675 | A1 * | 11/2002 | Helot et al. | 705/26 |

FOREIGN PATENT DOCUMENTS

| | | |
|---|---|---|
| WO | WO 0190869 | 11/2001 |

* cited by examiner

*Primary Examiner*—Jungwon Chang
(74) *Attorney, Agent, or Firm*—Barlow, Josephs & Holmes, Ltd.

(57) ABSTRACT

A character having a plurality of attributes is created by a network user while within a character-enabled network site. Each attribute is defined by at least one of either audio data and/or visual image data and is selected by the user from a plurality of attributes presented to the user through a user interface. The combination of attributes define a persona for the character. At least one of either an audio presentation and/or a visual image presentation is provided to the user interface. The presentations presented are selected from a plurality of presentations based on the character's persona. Data related to character attributes are stored in a database. One or more of the presentations presented to the user may be interactive, in that it allows for the user to make choices. In response to a user's interaction with the interactive presentation, additional audio presentation and/or a visual image presentation is provided to the user interface. Data indicative of user interaction with the interactive presentations is also stored in a database.

49 Claims, 14 Drawing Sheets

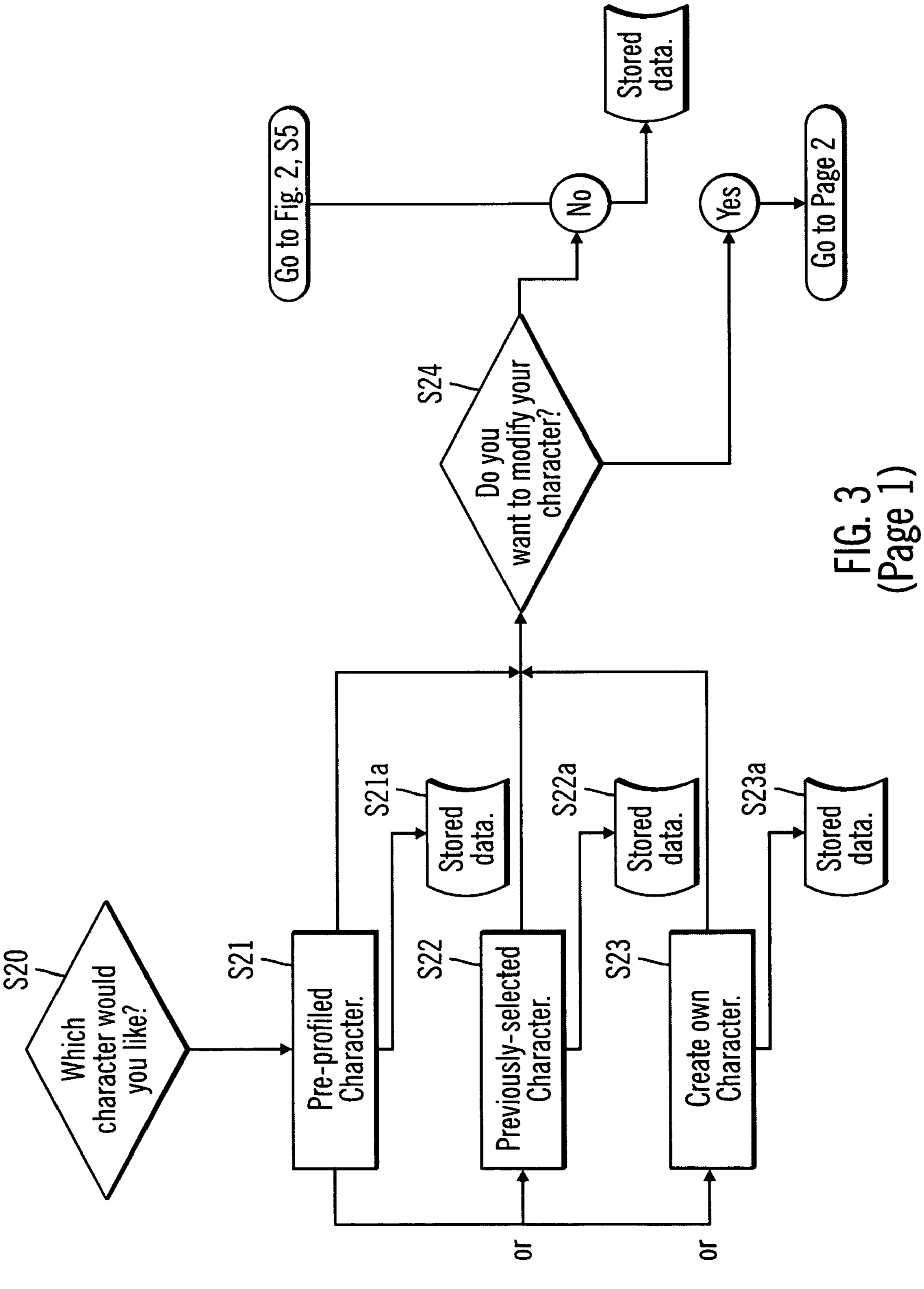
FIG. 3 (Page 1)

(Page 2)

(Page 3)

DATABASE

USER
- IP Address
- Password
- Character name (optional)
- Personal data (optional)
  - Name
  - Address
  - E-mail
  - Zip code
  - •
  - •

PERSONA
- Attribute Choices
  - Gender
  - Age
  - Dress
  - •
  - •
  - Accessories
  - •
  - •
  - Interests
  - •
  - •
- Actions Taken
  - Link to site A
    - Viewed page x
    - Took survey on topic z
      - Survey answers
    - Exit page x/time at page x
  - Return to home site/time at site A
    - Go to page 5
      - Select choice C
      - •
      - •

HISTORY
- Date
- Time in
- Time out

FIG. 11

METHOD AND SYSTEM FOR PRESENTING DATA OVER A NETWORK BASED ON NETWORK USER CHOICES AND COLLECTING REAL-TIME DATA RELATED TO SAID CHOICES

RELATED APPLICATIONS

This is a continuation of application Ser. No. 09/614,572, filed Jul. 12, 2000,now U.S. Pat. No. 6,952,716.

BACKGROUND OF THE INVENTION

1. Field of the Invention

The invention relates generally to an apparatus and method for presenting data over and information network based on choices made by the users of the network and collecting data related to the choices made by the users. More particularly, the invention relates to an apparatus and method for presenting audio presentations and visual image presentations to a network user based on choices made by the user while in a network site and collecting data related to the choices in real-time. As used herein "visual image" is broadly defined as drawn, printed or modeled objects, characters or scenes, including still, animation, motion, live action and video. Throughout the specification, the term "character" is used to describe certain aspects and features of the invention, for example, the term "character-enabled" is often used. The use of "character" instead of a collective "character, object or scene" is done for ease in readability of the specification and is not intended in any way to limit the scope of the invention.

2. Description of Related Art

The information and data made available over a network site is typically the same for each visitor to that network site. For example, in the context of the world-wide-web ("the web"), each visitor to a web site is generally presented the same audio and visual image data contained within the various web pages comprising the web site. Links presented on the web pages generally transfer the visitor to other web pages or in some cases to other web sites. All in all, contemporary web sites are static in nature in that they fail to take into consideration the individuality of their visitors and instead present to each visitor a substantially identical audio/visual experience. As a result, visitors to contemporary web sites often become bored with the web site in a relatively short time thereby reducing visitor time on a web site and the possibility of frequent, repeat visits by the user.

Hence, those concerned with increasing network site loyalty have sensed the need for an apparatus and method for presenting to network users audio data and visual image data that is indicative of the individuality of the network users. The present invention fulfils this need and others.

The collection of data related to the personal choices and preferences of an individual is essential for effective market research. The major purpose of market research is to minimize the risk to be undertaken by a company. By itself, market research is rarely conclusive, but instead is a useful tool to enable companies to make decisions that are more informed. Market research is used for a variety of purposes, including: market strategy, product development, product adoption, program evaluation, price sensitivity, name and message testing, awareness, usage, attitude, and behavior tracking, advertising testing, market tracking, customer satisfaction, customer profiling and segmentation, corporate image studies, employee satisfaction, bench marking and public opinion polls.

There are two basic types of market research, qualitative and quantitative. Qualitative research involves the more "touch-feely" aspect of gauging tastes, preferences and opinions, and includes focus groups, on-line focus groups, one-on-one interviews and executive interviews. Quantitative research involves the sampling of a base of respondents to enable the statistical inference of the data over a larger population. The data obtained is tabulated into useful categories that allow the researcher to draw statistically-sound conclusions. Qualitative research includes telephone surveys, mail surveys, intercept surveys and e-mail surveys.

Current market research is expensive and often time consuming. For example, for a hypothetical manufacturing company to gauge the tastes, preferences and opinions of the teen market as a basis to improve product development and enhance revenues, it has been suggested that focus groups, on-line focus groups and mall intercepts are the best approaches.

The cost estimate for a market research firm to conduct, analyze and summarize a focus group with between eight to ten people, is between $4,000 to $6,000. Market research firms also employ the Internet to conduct focus group studies. Some firms have a database of e-mail addresses of individuals who have agreed to be surveyed on an as-needed basis, while other firms purchase lists of e-mail addresses that fit a targeted profile. These focus groups are conducted by showing a user pictures of products or a concept and then posing a series of questions to the user. Those responses are then tabulated with the responses from other users. The costs associated with on-line focus groups are similar to regular focus groups.

The most common quantitative method suggested for teen-market analysis is mall intercepts. In a mall intercept, interviewers intercept mall shoppers that meet a certain targeted profile. These individuals are then interviewed for no more than twenty minutes and asked product and concept questions. The cost to perform a mall-intercept study varies, depending on the number of respondents targeted, the malls involved, and the time involved to conduct the surveys. For example, the cost of a mall intercept, in which 1,000 responses are received from shoppers in several geographic regions throughout the US may be as high as $100,000.

Hence, those concerned with collecting information related to user and consumer choices and preferences have sensed a need for an apparatus and method that enables a less expensive, more efficient and more reliable means of capturing specific and broad-base data on users, consumers and products. A need has also been felt for an apparatus and method of collecting market research data in real-time. The present invention clearly fulfills these needs and others.

SUMMARY OF THE INVENTION

Briefly, and in general terms, the present invention is directed to an apparatus and method that employs selectable and modifiable animation to collect data related to the choices made by the users of an information network.

In a first aspect, the invention relates to a method having application within an information network having at least one character-enabled network site. The method provides for the presentation of data to a network user based on choices made by the user while the user is within a character-enabled network site. In its basic form the method includes the step of creating a character having a plurality of attributes. Each attribute is selected by the user from a plurality of attributes presented to the user through a user interface to create a persona for the character. Each attribute is defined by at least one of either audio data and/or visual image data. An attribute may comprise one or more pieces of audio data, one or more pieces of visual image data or a combination of one or more pieces of audio data and visual image data. The method further includes the step of providing to the user interface, at least one of either an audio presentation and a visual image presentation selected from a plurality of presentations based on the persona of the character created.

By providing audio and visual image presentations to the user interface based on the persona of the created character, the present invention presents to the user a customized audio and/or visual image experience while the user is visiting the network site.

In a more detailed facet of the invention, the method further comprises the step of storing persona data indicative of the selected attributes. By storing this data, the present invention allows for the collection of user choices which may be indicative of the user's tastes, preferences and opinions. In another detailed aspect, the plurality of presentations may include passive presentations and interactive presentations, each in turn comprising one or both of a visual image displayed on the user interface and sound heard through the user interface. In another detailed facet, when an interactive presentation is provided to the user interface, the method further includes the step of, in response to user interaction with the interactive presentation, providing to the user interface at least one of either an audio presentation and/or a visual image presentation selected from the plurality of presentations. By providing audio and/or visual image presentations to the user interface based on the response made by the user to an interactive presentation the present invention allows for further customization of the audio/visual experience. In yet another detailed aspect of the invention, the method further includes the step of storing data indicative of user interaction with the interactive presentation.

In a second aspect, the invention relates to an apparatus for presenting data to a network user based on choices made by the user while within a character-enabled network site. The apparatus includes a character processor for creating a character having a plurality of attributes. Each attribute is selected by the user from a plurality of attributes presented to the user through a user interface to create a persona for the character. Each attribute is defined by audio data and/or visual image data. The apparatus further includes a selection processor for providing to the user interface, at least one of either an audio presentation and/or a visual image presentation selected from a plurality of presentations based on the persona of the character created.

In a third aspect, the invention relates to a method having application within an information network having at least one character-enabled network site. The method provides for the presentation of data to a network user based on choices made by the user while the user is within a character-enabled network site. In its basic form the method includes the step of associating a character with the user. The character has a plurality of attributes, each defined by at least one of either audio data and/or visual image data. The plurality of attributes collectively define a character persona. The method further includes the step of providing to the user interface, at least one interactive presentation selected from a plurality of presentations based on the character persona. The interactive presentation is defined by audio data and/or visual image data. Also included in the method is the step of, in response to user interaction with the interactive presentation, providing to the user interface at least one of another interactive presentation and a passive presentation. The passive presentation is defined by at least one of audio data and visual image data.

By providing one or more of either an interactive or a passive presentation to the user interface based on the responses and choices made by the user to an interactive presentation, the present invention takes into account the actions of the user, which are likely to be indicative of the tastes preferences and opinions of the user, and customizes the audio/visual experience presented to the user accordingly.

In a detailed aspect of the invention, the step of providing to the user interface, at least one interactive presentation selected from a plurality of presentations based on the character persona includes the steps of linking the character persona with interactive presentations of interest; and selecting for presentation to the user interface those interactive presentation that are linked with the character persona. In another facet of the invention, the step of providing to the user interface at least one of another interactive presentation and a passive presentation in response to user interaction with the interactive presentation comprises the steps of linking the user interaction with other interactive presentations and passive presentations of interest; and selecting for presentation to the user interface, those other interactive presentations and passive presentations that are linked with the character persona.

In a fourth aspect, the invention relates to an apparatus for presenting data to a network user based on choices made by the user while within a character-enabled network site. The apparatus includes a character processor for associating a character with the user. The character has a plurality of attributes, each attribute defined by at least one of either audio data and/or visual image data. The plurality of attributes collectively defines a character persona. In a basic configuration of the apparatus the character processor may comprise a user interface functioning in cooperation with site programs which may be resident in the character-enabled network site. The apparatus further includes a selection processor for providing to the user interface, at least one interactive presentation selected from a plurality of presentations based on the character persona. The interactive presentation is defined by audio data and/or visual image data. The selection processor also, in response to user interaction with the interactive presentation, provides to the user interface at least one of another interactive presentation and a passive presentation. The passive presentation is defined by at least one of either audio data and/or visual image data. In a basic configuration of the apparatus the selection processor may comprise site programs which may be resident in the character-enabled network site. These site programs operate in conjunction with various stored audio data/presentations and visual image data/presentations to provide the presentations to the user interface.

In a fifth aspect, the invention relates to a method that finds application within an information network having a database and at least one character-enabled network site accessible through a user interface with audio and visual image presentation capability. The method is for obtaining and storing data indicative of one or more attribute selections made by a network user while within the character-enabled network site. The method includes the steps of storing at least one of either audio data and/or visual image data of a plurality of characters, each character having at least one associated modifiable attribute. For each modifiable attribute the method further includes the step of storing at least one of either audio data and/or visual image data of at least one modification attribute. The method also includes the step of presenting the plurality of characters to the user through the user interface for selection by the user. Upon selection of a character, the method includes the step of storing data indicative of the selected character in a database and presenting the at least one modification attribute to the user through the user interface for selection by the user. Upon selection of the modification attribute, the method further includes the step of storing data indicative of the selected modification attribute in the database.

In a sixth aspect, the invention relates to an apparatus for obtaining and storing data indicative of one or more attribute selections made by a network user through a user interface with audio and visual image presentation capability. The apparatus includes a character memory storing at least one of either audio data and/or visual image data of a plurality of characters, each having at least one associated modifiable attribute. For each modifiable attribute, the apparatus further includes an attribute memory for storing at least one of either audio data and/or visual image data of at least one modification attribute. The apparatus also includes a processor for presenting the plurality of characters to the user through the user interface for selection by the user. Upon selection of a character, the processor presents the at least one modification attribute to the user for selection by the user. Further included in the apparatus is a database for storing data indicative of the selected character and the selected at least one modification attribute.

In a seventh aspect, the invention relates to a method finding application in an information network having at least one character-enabled network site. The method is for sharing data among network users based on choices made by each of the users while within a character-enabled network site. The method includes the steps of, for each user, creating a character having a plurality of attributes. Each attribute is selected by the user from a plurality of attributes presented to the user through a user interface to create a character profile. Each attribute is defined by at least one of either audio data and/or visual image data. The method also includes the step of providing to at least one user interface, at least one of either an audio presentation and/or a visual image presentation indicative of at least one other character profile. Also included is the step of providing a communications link between the users.

These and other features and advantages of the invention will become apparent from the following detailed description, taken in conjunction with the accompanying drawings, which illustrate by way of example the features of the invention.

BRIEF DESCRIPTION OF THE DRAWINGS

FIG. 11 depicts an exemplary database table including records of choices made by network users.

DETAILED DESCRIPTION OF THE PREFERRED EMBODIMENTS

Figure 1:
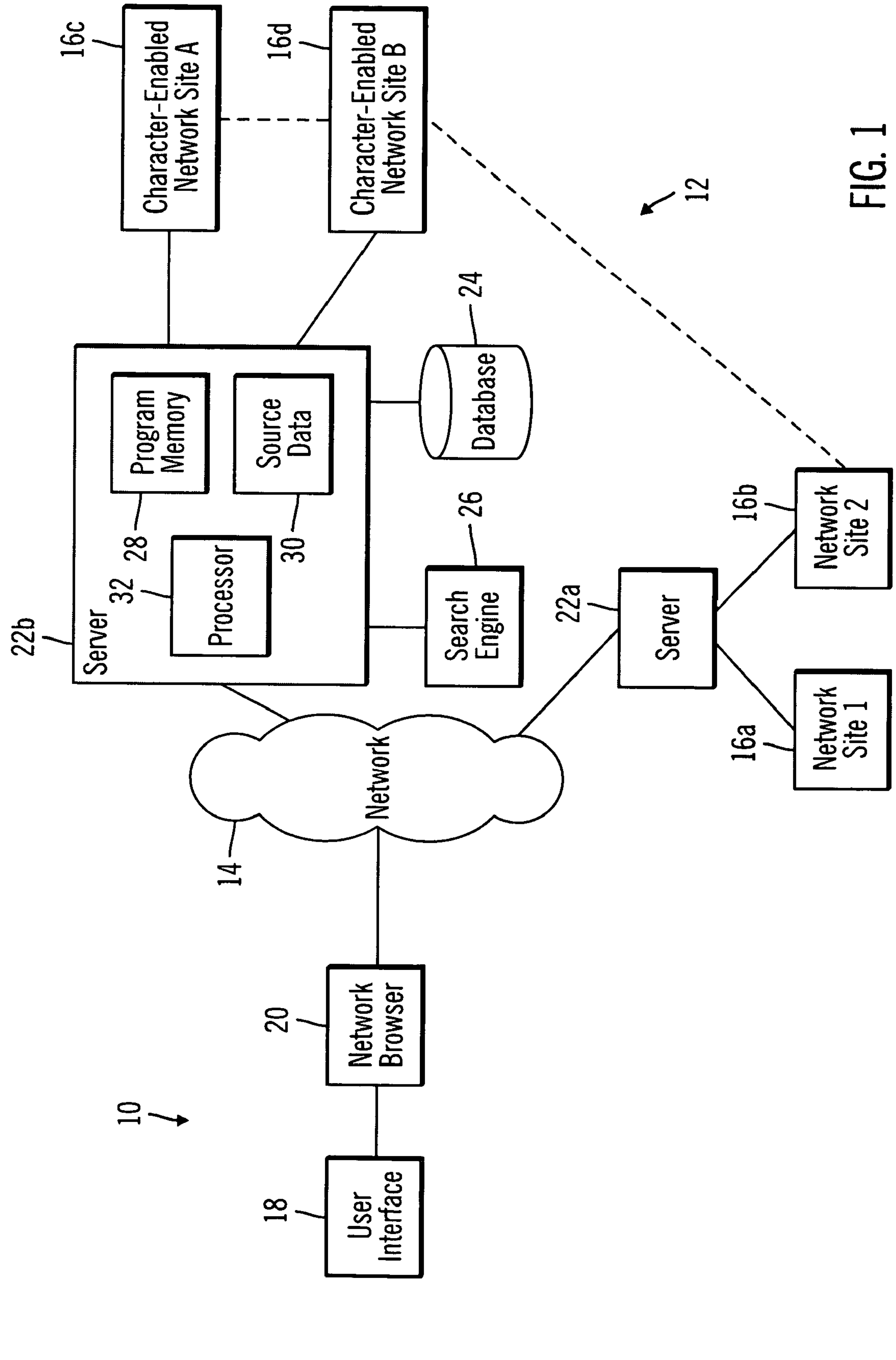
FIG. 1 is a block diagram of an information network including a user side and a network-site side having character-enabled network sites operating in accordance with the present invention.

Referring now to the drawings, wherein like reference numerals denote like or corresponding parts throughout the figures, and particularly to FIG. 1, there is shown an information network including a user side 10 and a network-site side 12 interfacing through a network 14. The network 14 provides the means through which a user may access a plurality of network sites 16*a*, 16*b* and character-enabled network sites ("C-E sites") 16*c*, 16*d*. The features of the C-E sites 16*c*, 16*d* are described in detail below. The network 14 may include, by way of example, but not necessarily by way of limitation, the Internet, Internet II, Intranets, and similar evolutionary versions of same.

The client side 10 includes a user interface 18 and network browser 20 through which a user may communicate with the network-site side 12 via the network 14. The user interface 18 may include a personal computer, network work station or any other similar device having a central processing unit (CPU) and monitor with at least one of audio presentation, i. .e. sound, capability and visual image presentation, e. g. video, animation, etc., capability. Other devices may include portable communication devices that access the information network, such as cellular telephones or hand held devices, e. g., Palm Pilots. The client side 10 further includes a graphical user interface (GUI) that facilitates communication between the client side and the network-site side 12. Client-side software may be resident in the user interface 18. Alternatively, the client-side software may be network-based software capable of being accessed over the network 14. For example, a user may be able to access the client-side software directly on the World-Wide-Web ("the Web").

The network-site side 12 includes a plurality of network sites 16*a*-16*d* and associated servers 22*a*, 22*b*. Also included on the network-site side 12 is a central database 24 for storing information and a search engine 26. The server 22*b* houses a program memory 28 for storing the network-site software programs, i. e., "site programs", which operate each of the C-E sites 16*c*, 16*d* in accordance with the invention. Also housed within the program memory 28 is the search engine software and database software. The server 22*b* also houses a source data 30 for storing the data required by the site programs. While FIG. 1 depicts only one server 22*b* with two associated C-E sites, 16*c*, 16*d*, the information network may include any number of these items. The other server 22*a* on the network-site side 12 includes similar memory and storage devices, which for ease of illustration are not depicted. The devices store the programs and data necessary to operate the network sites 16*a*, 16*b* associated with the server 22*a*. In the exemplary information network of FIG. 1, however, these network sites 16*a*, 16*b* are not configured to operate as character-enabled sites.

In accordance with the invention, C-E sites 16*c*, 16*d* operate under the control of site programs housed in the program memory 28. The site programs are created in browser usable file formats, such as but not limited to JavaScript, Flash Animation (.SWF), HTML, dHTML, CGI, ASP and Cold Fusion, to present either one or both of audio data/presentations and visual image data/presentations to the user interface 18. The audio data and visual image data required by the site programs is stored in the source data 30.

The site programs are designed to provide to the user interface 18 audio presentations and visual image presentations tailored to the "persona" of a character, as defined by a network user. These audio presentations and visual image presentations are selected from a plurality of presentations resident within the information network. The "persona" of a character is defined by a number of attributes, which in turn are defined by at least one of audio data and visual image data. "Attributes" as used herein means a quality or characteristic inherent or ascribed to a character, object, or scene. Character attributes may include physical characteristics, emotional characteristics, personal interest, opinions and preferences. Object and scene attributes generally include but are not limited to physical characteristics. The persona of a character may be further defined by the actions of the character, as controlled by the user through the user interface 18.

In accordance with the present invention, the "attribute" aspect of a character persona may be defined by a user in any of several ways. For example, the character may have a predetermined persona which the user may choose to adopt. Alternatively the user may modify or customize the persona of a pre-profiled character. Additionally, the user may create his own character persona from scratch. Each of these character development approaches is described more fully below. The "action" aspect of a character persona is defined by the user based on how the user interacts with the audio presentations and visual image presentations provided to the user interface.

The persona of a character determines the experience the user has on the C-E site 16*c*, 16*d*. Different characters call up different audio presentations and visual image presentations. For example, depending on the persona of the character selected, different music, games, books, movies, and videos may be provided to the user interface 18. The present invention cross references or links character attributes and character actions to specific audio presentations or visual images presentations. This cross referencing or linking may be accomplished through a look-up table or through frame technology. Using the attributes and actions associated with a given character, the site program determines which audio presentation and visual image presentations to present to the user interface 18.

With regard to pre-profiled characters, the site program in combination with the audio data and visual image data stored in the source data 30 define one or more pre-profiled characters. The site program/data defines the characters such that each has his or her own persona. An example of several characters is presented in FIG. 4. A detail of one of these characters is presented in FIG. 6. The user gets a quick glimpse of the character's persona in two ways. First, the user sees what the character looks like and how he is dressed. Second, as the user does a roll-over of each character, there is a visual or audio response that gives the user a sense of that character's personality.

As previously mentioned in accordance with the invention, the site programs are designed to provide to the user interface 18 audio presentations and visual image presentations directed toward the persona of a character. In the case of a pre-profiled character, the pre-defined attributes of the character determine the audio presentations and visual image presentations provided to the user interface 18.

Figure 9:
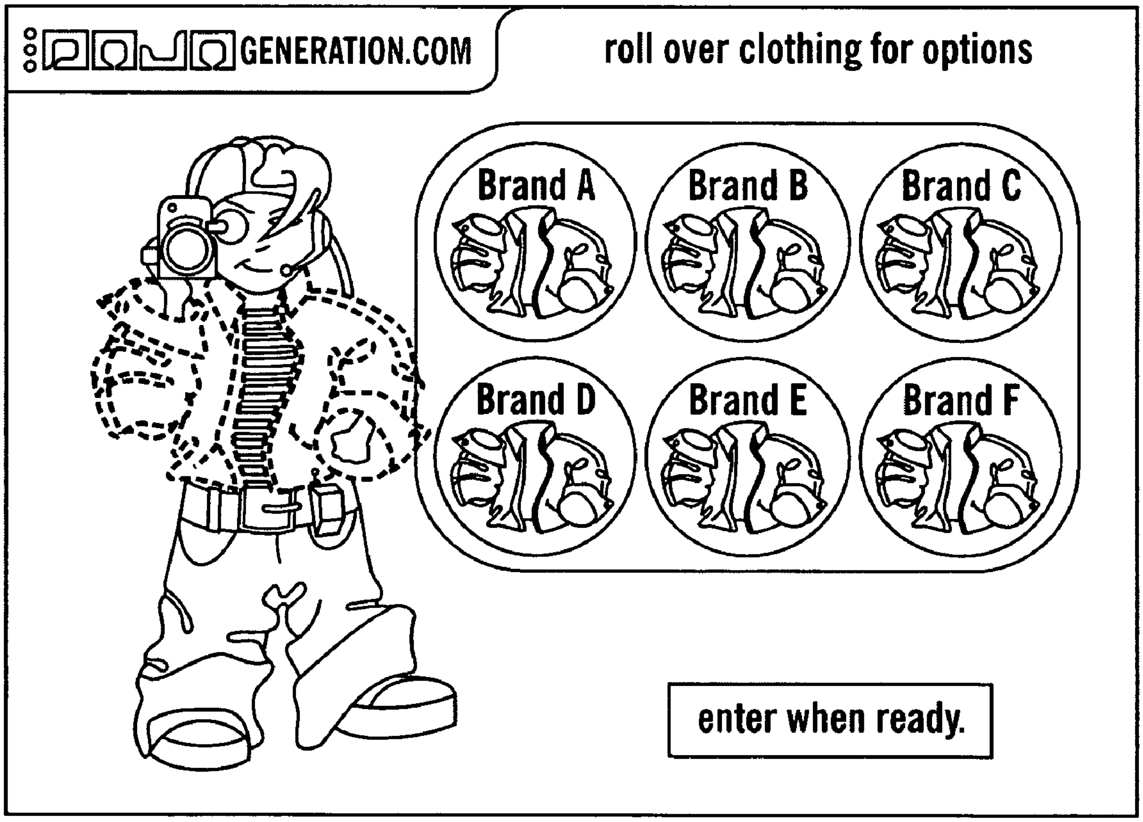
FIG. 9 depicts a follow-up screen to the screen of FIG. 8 in which several choices with regard to the brand of shirt are presented.

With regard to customized characters, the site program/data provides the audio data or visual image data necessary to modify or change select attributes of a pre-profiled character. For example, as shown in FIG. 9, the site program/data may present to the user a pre-profiled character of a human figure wearing a "brand A" shirt, while further presenting visual images representative of selectable attributes, e. g., brand B, brand C or brand D shirts. As a subset of the attribute selections, the site program/data may provide for further modification of an attribute. For example, once the visual image data for a specific brand is presented and selected, the site program/data may present to the user the option of changing the style, size or color of the shirt.

As a an additional feature of the present invention, the site program monitors the development of a customized character, notes the attributes modifications and selections made by the user and selects the audio presentations and visual image presentations provided to the user interface 18 accordingly. More specifically, the site program keeps track of the character attributes selected and modified by a user. Certain C-E site information is associated with certain character attributes and actions. For example, if a user decides that his character will wear athletic shoes then audio presentations and visual image presentations related to sports are provided to the user interface 18. If the user selects trance music as background music to accompany his character then audio presentations and visual image presentations related to that type of music are provided to the user interface 18.

With regard to created characters, the site program/data may allow the user to create a character from scratch. This may be done using commercially available animation programs such as Flash Animation (.swf) and Cold Fusion. Similar to the customized character, the site program monitors the development of a created character, notes the attributes of the created character and selects the audio presentations and visual image presentations provided at the user interface 18 accordingly.

As previously mention, when within a C-E site, the user interface 18 is provided with at least one of an audio presentation or a visual image presentation. The presentations provided are selected from a plurality of presentations resident within the information network based on the persona of the character. Exemplary audio presentations include background music, sound effects, dialog and character comments. Exemplary visual presentations include background scenery, text-identified links, pictorial-identified links, pop-up menus and windows.

These presentations may be further categorized as being either passive or interactive. Interactive presentations allow for the user to make an action-related choice via the user interface 18. For example, the user interface 18 may be provided with a text-identified link that gives the user the choice to follow the link to another page on the C-E site or to another network site. As another example, a pop-up window may appear on the user interface 18 asking the user a survey question. Many other interactive presentations may be provided to the user interface 18. Passive presentations, on the other hand, do not allow for user interaction. An example of a passive presentation is a non-hyperlinked text or graphic. As an additional feature of the present invention, the choices made by a user in response to the interactive presentations may be used to further define the persona of the character and to adjust the audio presentations and visual image presentations provided at the user interface 18.

Figure 2:
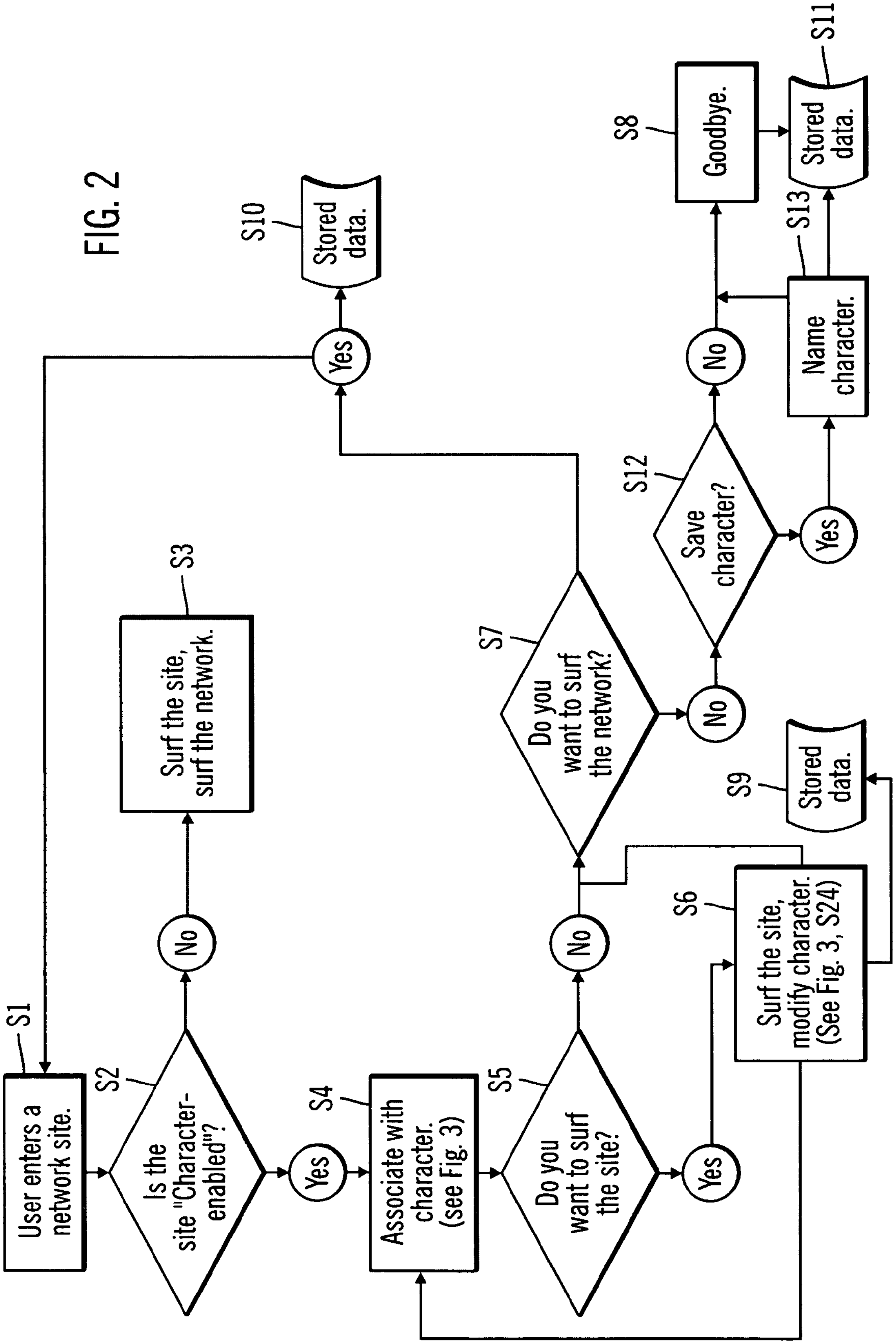
FIG. 2 is a top-level flowchart depicting the process by which a network user explores the information network of FIG. 1.

In operation, with reference to FIG. 2, at steps S1 and S2, a user enters a network site via the user interface 18 (FIG. 1) and network browser 20. The network site entered may be a C-E site 16*c*, 16*d* accessed through the server 22*b* and thus operating in accordance with the invention. Alternatively, the network site 16*a*, 16*b* entered by a user may not offer the user the audio or visual image experience imparted by the invention. In this situation the user, at step S3 (FIG. 2), surfs the network site or the network.

At step S4, upon entering a C-E site, the user is asked to associate with a character. Details related to character association are presented in the flow charts of FIG. 3, which are described in detail below. In general, however, upon entering a character-enabled site the user is given the opportunity to choose from a group of pre-profiled characters or create a custom character. Each of the pre-profiled characters has a built-in profile corresponding to its personality. The user is further given the opportunity to adjust the profile of any of the given pre-profiled characters. For example, the user may be able to make choices regarding the pre-profiled character's hairstyle, ethnicity (skin tone), clothing (top, bottom, outerwear, fabric choice, brands, style, size, and color), eye wear, hat (style, fir, how to wear the hat), shoes, food/drinks to consume, vehicle to ride, accessories (cellphone, Palm Pilot) and background music. As a user makes a choice, that choice is animated onto the character. As an example, when the user chooses a particular shoe for the character to wear from a group of four photos of shoes, that choice is transformed into an animated shoe.

Figure 3:
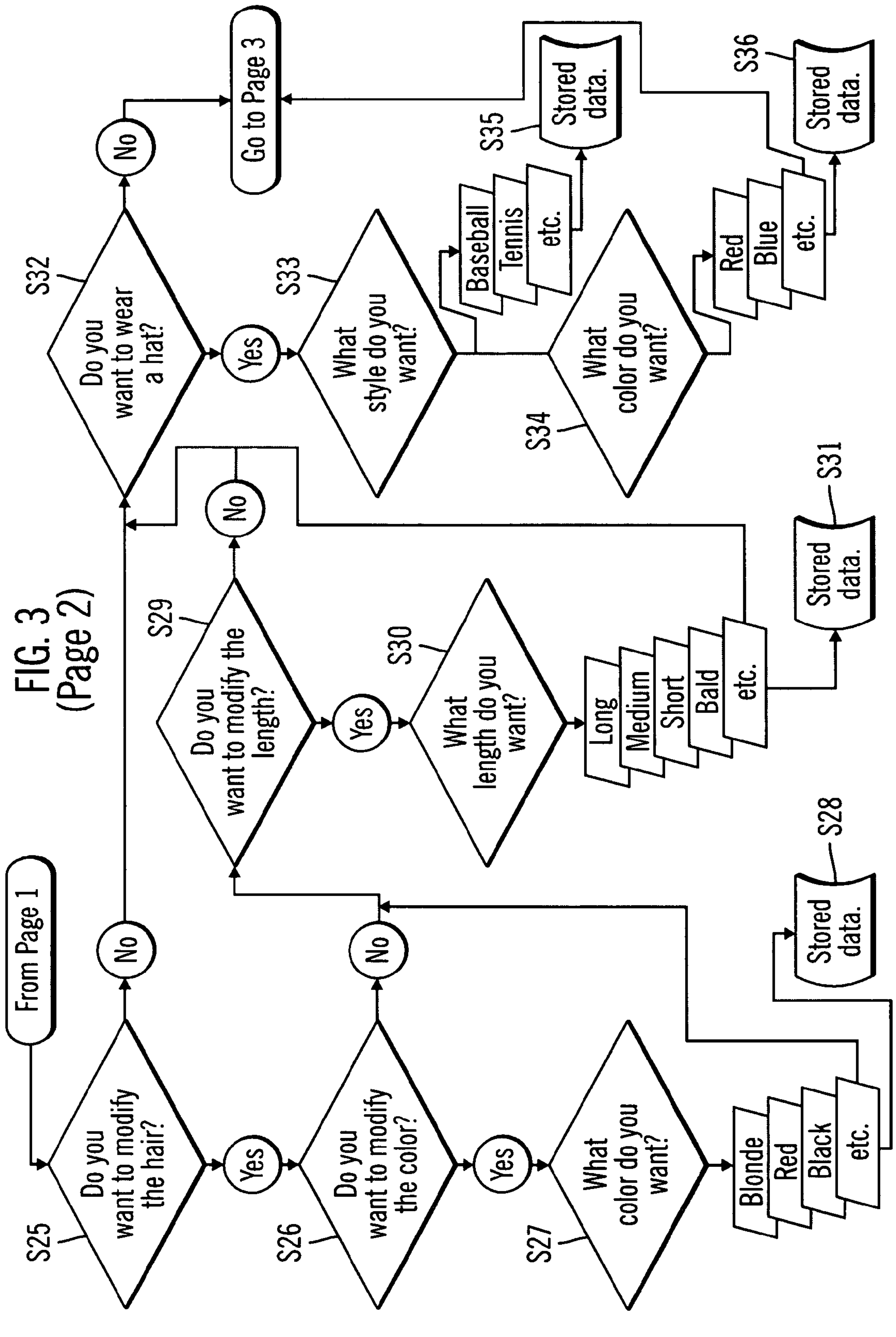
FIG. 3 is a detailed flowchart depicting the process by which a user interacts with the character-enabled network sites of FIG. 1.
Figure 3:
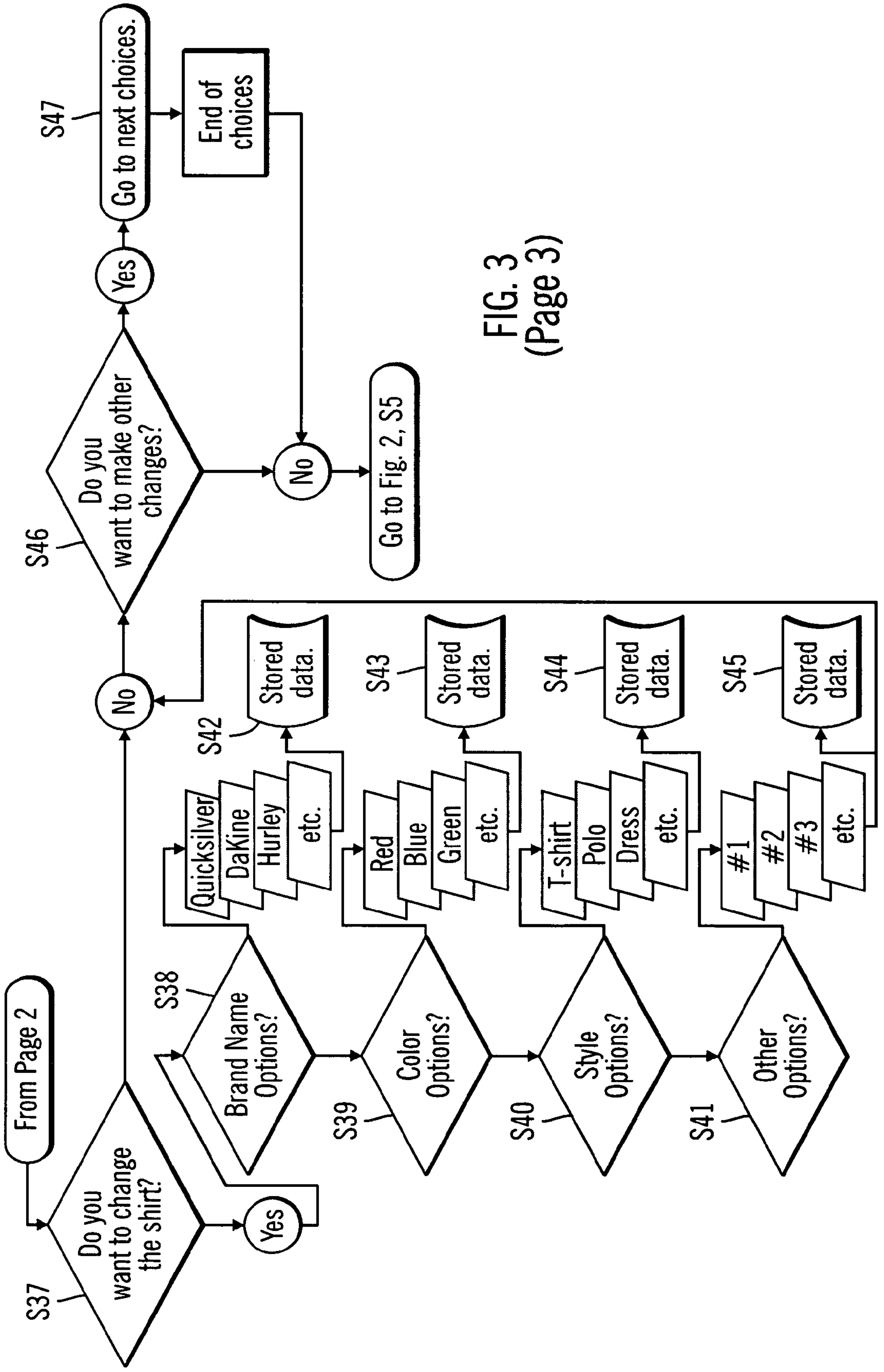
Figure 4:
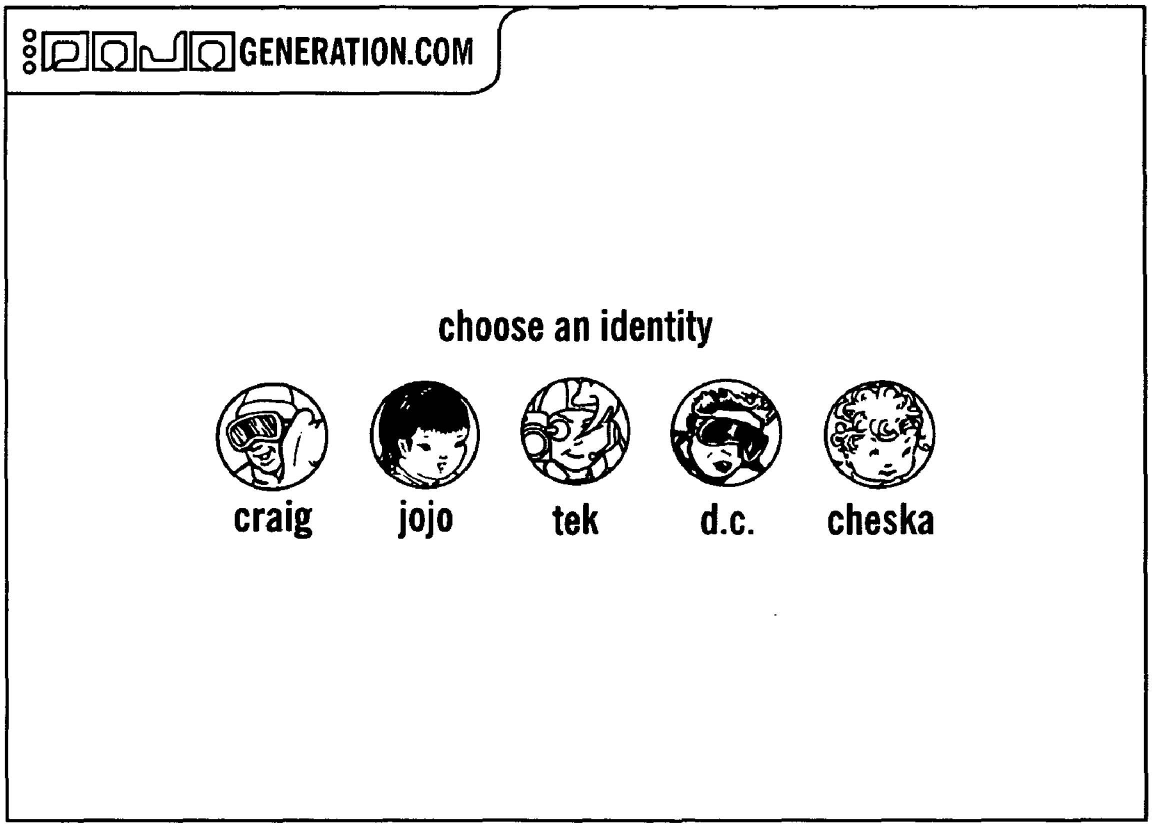
FIG. 4 depicts a page of an exemplary character-enabled network site having a collection of pre-profiled characters.
Figure 5:
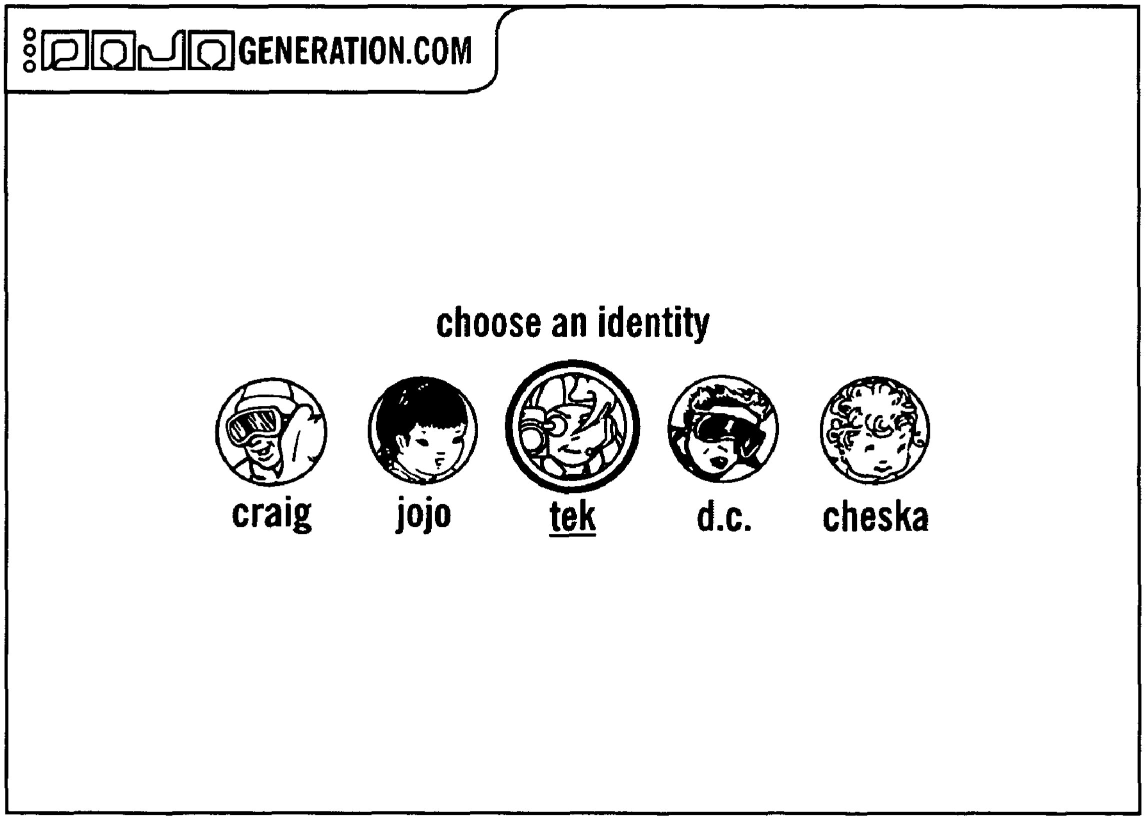
FIG. 5 depicts a follow-up to the screen of FIG. 4, in which one of the pre-profiled characters has been selected in order to gather additional information related to the persona of the character.
Figure 6:
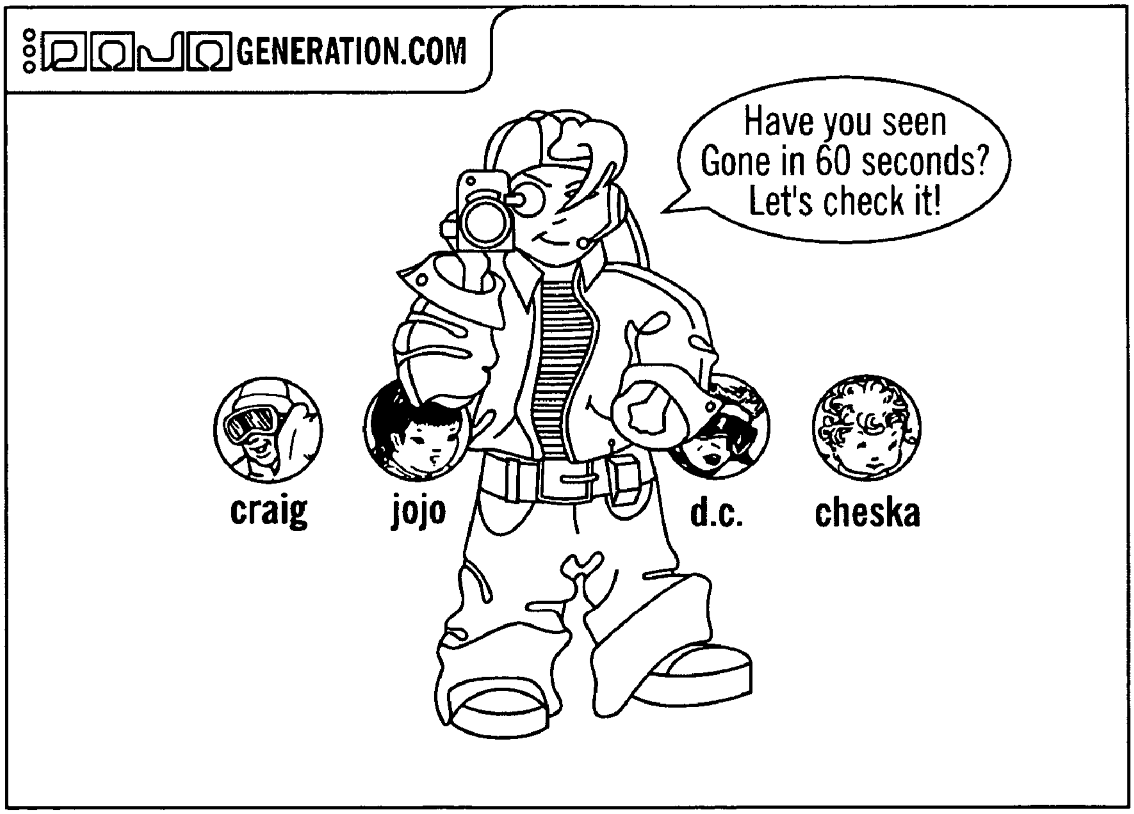
FIG. 6 depicts a follow-up screen to the screen of FIG. 5, in which a detail of the selected pre-profiled character is presented and animated comments indicative of the character's person are presented.
Figure 7:
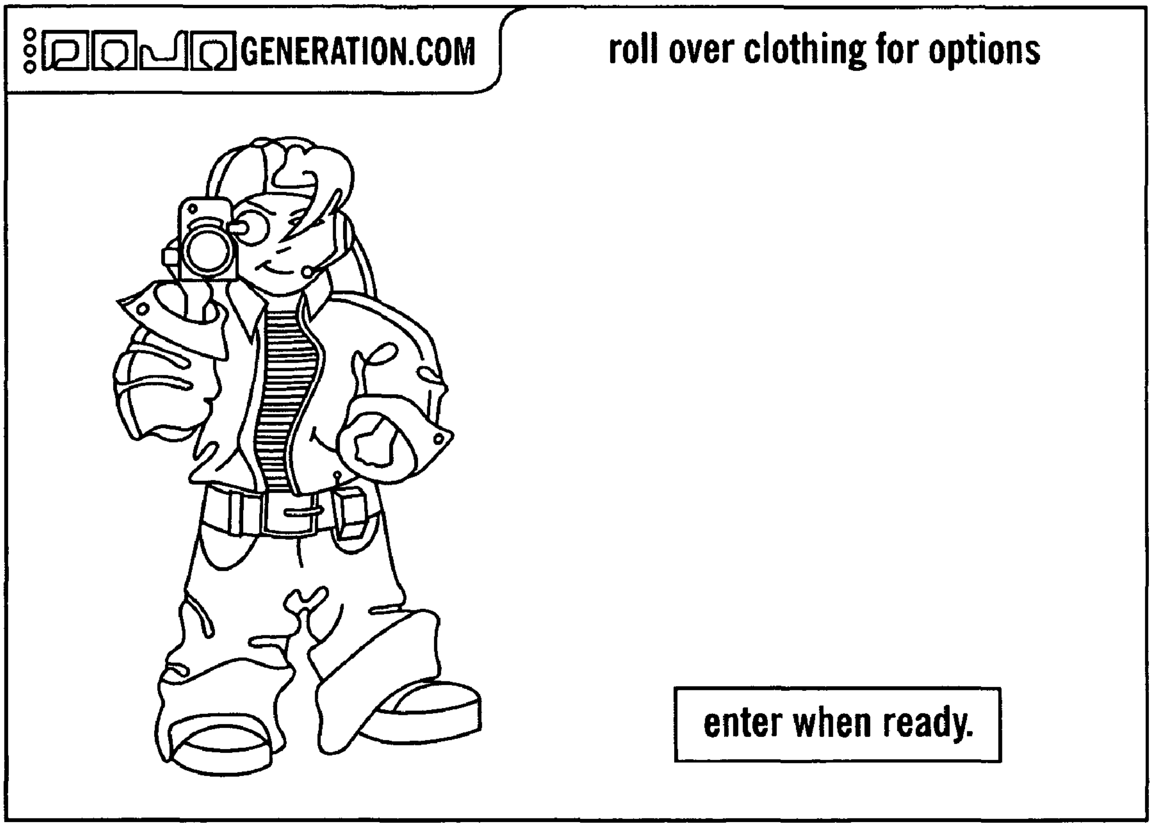
FIG. 7 depicts a follow-up screen to the screen of FIG. 6, in which the remaining characters are dismissed and the opportunity to modify the selected pre-profiled character is presented.

With reference to FIG. 3, at steps S20-S23, the user makes a character selection. For example, at step S2 1, the user is presented with an visual image display of a plurality of pre-profiled characters, each with a set of attributes (FIG. 4). A roll-over of each character highlights the character and may offer a sound bite indicative of the character's personality (FIG. 5). A continued roll-over of a character reveals a full figure of the character and audio or visual comments which further indicate the personality of the character (FIG. 6). Upon selection of a character, the remaining characters are dismissed.

Alternatively, at step S22, the character may be a previously-selected character which the user may have used in the past and which may be automatically associated with the user, via the IP address plus cookie of the user's computer or, called up by the user from the database 24. The process for saving a character is described later. In addition, at step S23, the character may be one which is created by the user using any one of several well known animation programs, such as Flash Animation or Cold Fusion. Data pertaining to the character selections made by a user are stored in the central database 24 at steps S21*a*, S22*a* and S23*a*.

Figure 8:
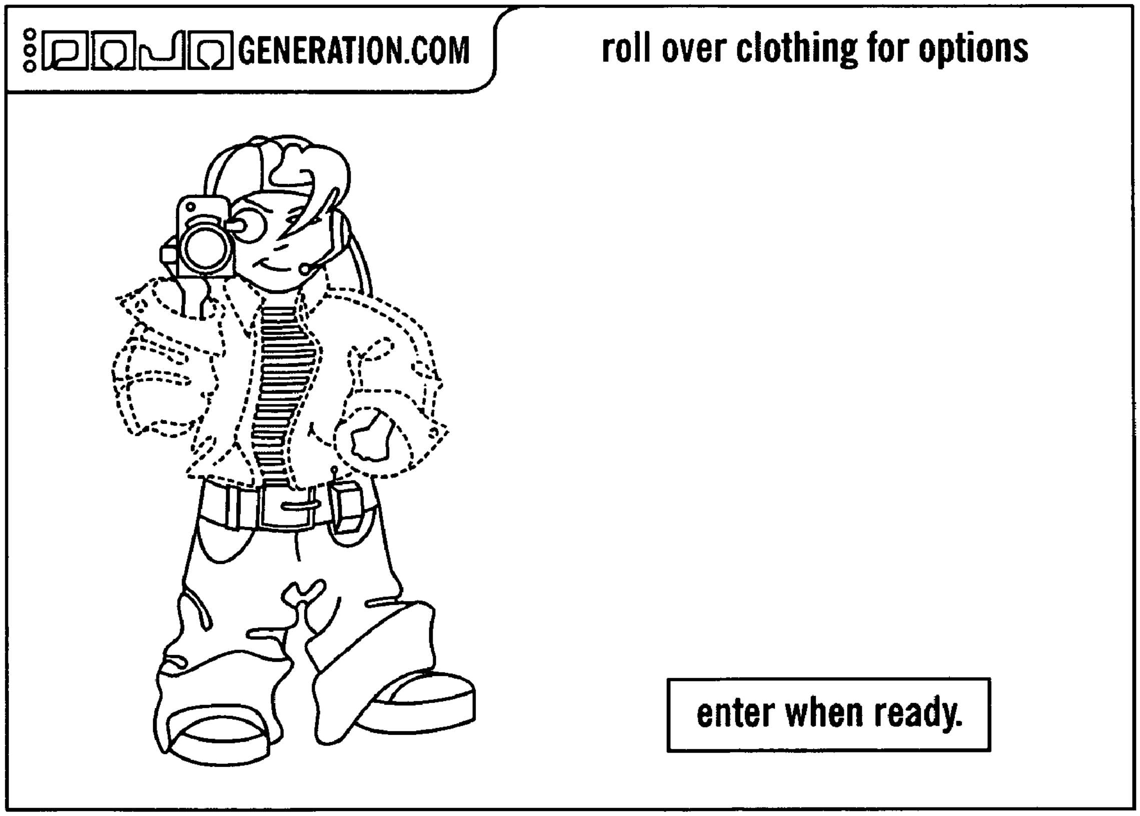
FIG. 8 depicts a follow-up screen to the screen of FIG. 7 in which a roll-over of the shirt causes the shirt to highlight thereby indicating that the shirt may be modified.
Figure 10:
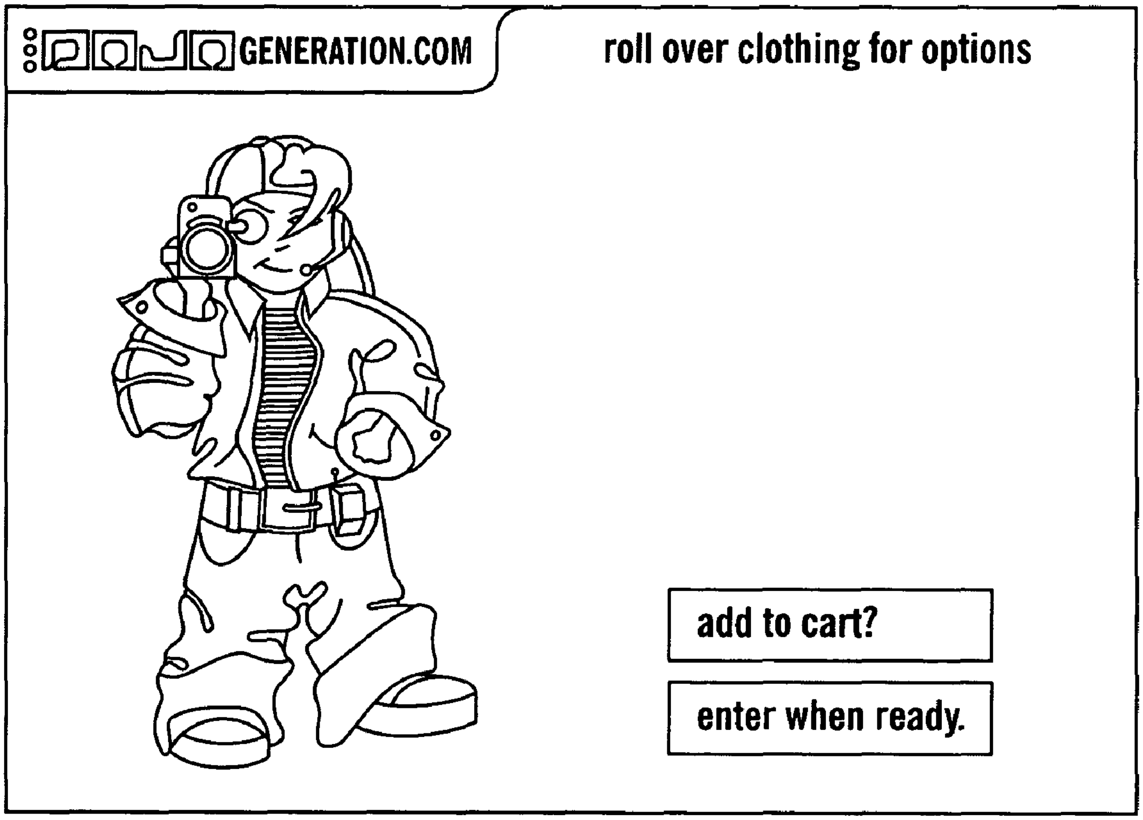
FIG. 10 depicts a follow-up screen to the screen of FIG. 9 in which the shirt selected is displayed on the character.

Once the user has selected his new character or accessed his previously-used character at step S24, the user is given the option to make attribute modifications. If the user does not want to modify his character, the user may begin to surf the network site and the network (FIG. 2, step S5). If the user does want to modify his character then any of a plurality of modifications may occur, depending on the options as defined by the site program/data. In one configuration, attribute modifications are controlled by a roll-over effect. As a user rolls over attributes, e. g., shirts, pants, hand-held devices, of a character modifiable attributes highlight to indicate that choices are available (FIG. 8). For example, at step S25, the user may choose to modify his character's hair by selecting the color (step S26) and length (step S29). If the user chooses to modify the color then at step S27 the user is presented with a plurality of color choices. Once the selection is made the selected choice is stored in the central database (step S28). Likewise, if the user chooses to modify the length of hair, at step S30 the user is presented with a plurality of length choices. Once the selection is made, the choice is stored in the central database (step S31). An example of an additional available modification is the option to change the shirt being worn by the character (step S37). If the user chooses to modify the shirt then at steps S38, S39, S40 and S41 the user is presented with a plurality of options regarding the brand (FIG. 9), color, style and other options of the shirt. Once a choice is made by the user, the choice is displayed on the character (FIG. 10). Selections made by the user are stored in the database 24 at steps S42, S43, S44 and S45.

A character's persona may also be changed by adding attributes to the character. For example, at step S32 the user is presented with the option of adding a hat to his character. If the user decides to have his character wear a hat then, at steps S33 and S34, the user is also presented with options regarding the style and color of hat. Again, each selection made by a user is stored in the central database 24 at steps S23 and S24.

At step S46, the user decides if he wants to continue modifying his character. If the user decides to continue the modification process the user proceeds to steps S47 where other character attributes may be changed, removed or added. The number of available modifications which may be made to a character are within the control of the proprietor of the C-E site. The character attributes available for modification are programmed into the site program and the necessary audio data and visual image data is stored in the data storage. By periodically revising the attribute selection, the site provides the user with new animation experiences. An an incentive to get users to make modifications to their characters the user may be rewarded for each choice made, for example, through the use of sound, e. g. "nice choice", or character movement, e. g. hand clapping.

Returning to FIG. 2, once the user has exhausted all possible attribute modification options and has completed the customization of his character, at steps S5 and S6, the user may decide to surf the network site in which the character was created. The character accompanies the user as he navigates through the site. Depending on the site program/data, the character may interact with the user through various comments and actions. For example, if the user is inactive within the site for a period of time, the character may start to tap his foot to entice the user to act. Data regarding the portions of the network site visited by the user are stored in the database at step S9. For example, data regarding the links selected by the user may be cross-referenced to the character and stored in the database. As an additional feature when the user is surfing the C-E site wherein his character was created, the user has the option of further modifying his character's profile. Any modifications made to the character are stored in the central database 24.

At step S7 the user may chose to surf the network. This may be accomplished in several ways. For example, the C-E site in which the user currently resides may include links to other network sites. The user may choose to follow these links to the associated network sites. With reference to FIG. 1, the link from the C-E site 16*d* may be to another C-E site 16*c* or it may be to a network site 16*b* that is not character-enabled. If the user follows a link to another C-E site 16*c*, the persona data of the character associated with the user may be transferred to the other C-E site. The transfer of persona data may be accomplished by cookie sharing. For example, a string of JavaScript may be written to allow the other character-enabled method site's 16*c* cookie to recognize the cookie from the first C-E site 16*d*.

The links selected by the user and his associated character may be recorded in the central database 24. The central database 24 thus contains information as to the profile of the character and the links of interest to the character. This type of information may be beneficial to the proprietor of the network site as a means of determining the type of people who are visiting its network site.

As an additional aspect of the invention, users of C-E sites may be able to share or exchange data. For example, the character-enabled sites may be configured to support a chat room or other virtual environment, wherein the various users may enter the room or environment under the guise of their character and communicate with each other via the user interface. Character persona data is shared among visitors through, for example, JavaScript programming which presents data indicative of character's persona to the audio/visual display of the user interface. This data may include a picture of the character, a sound bite from the character and/or a written description of the character. Communication between users is provided using well known communications protocols such as that used by ICQ or AOL Instant Messenger.

Once the user is finished surfing the network site or the network, at step S12, he is given the option of saving his character for future use. If the user selects to do so then at step S13 the user is asked to assign a name to his character. The user may also be asked to designate a password. Upon doing so, the user-assigned name is added to the central database and the attributes associated with the user's character, which are stored in the central database, are linked to the user-assigned name.

In accordance with the present invention, the character created by the user may be retrieved from the central database 24 by the user through other C-E sites. This is accomplished by a plug-in written, for example in Java, located at the newly accessed C-E site. While within the new network site, the user may be able to further modify his character. The plug-in also allows any changes a user makes to his character or any choices made on a network site to be stored in the central database 24.

The central database 24 (FIG. 1) comprises processes that gather, process and store data. The database software may be implemented using Microsoft SQL7, Oracle8i or Access database programs. In an exemplary embodiment, the central database 24 comprises a plurality of tables which store data indicative of the activities occurring at each of the C-E sites. Such activities may include, but are not limited to, user selection and modifications of character, user navigation through a site, length of time at certain parts of a site, brand product selected and links followed. Essentially, each choice a user makes when within a C-E site is stored in the central database 24. A exemplary database table is shown in FIG. 11.

Figure 12:
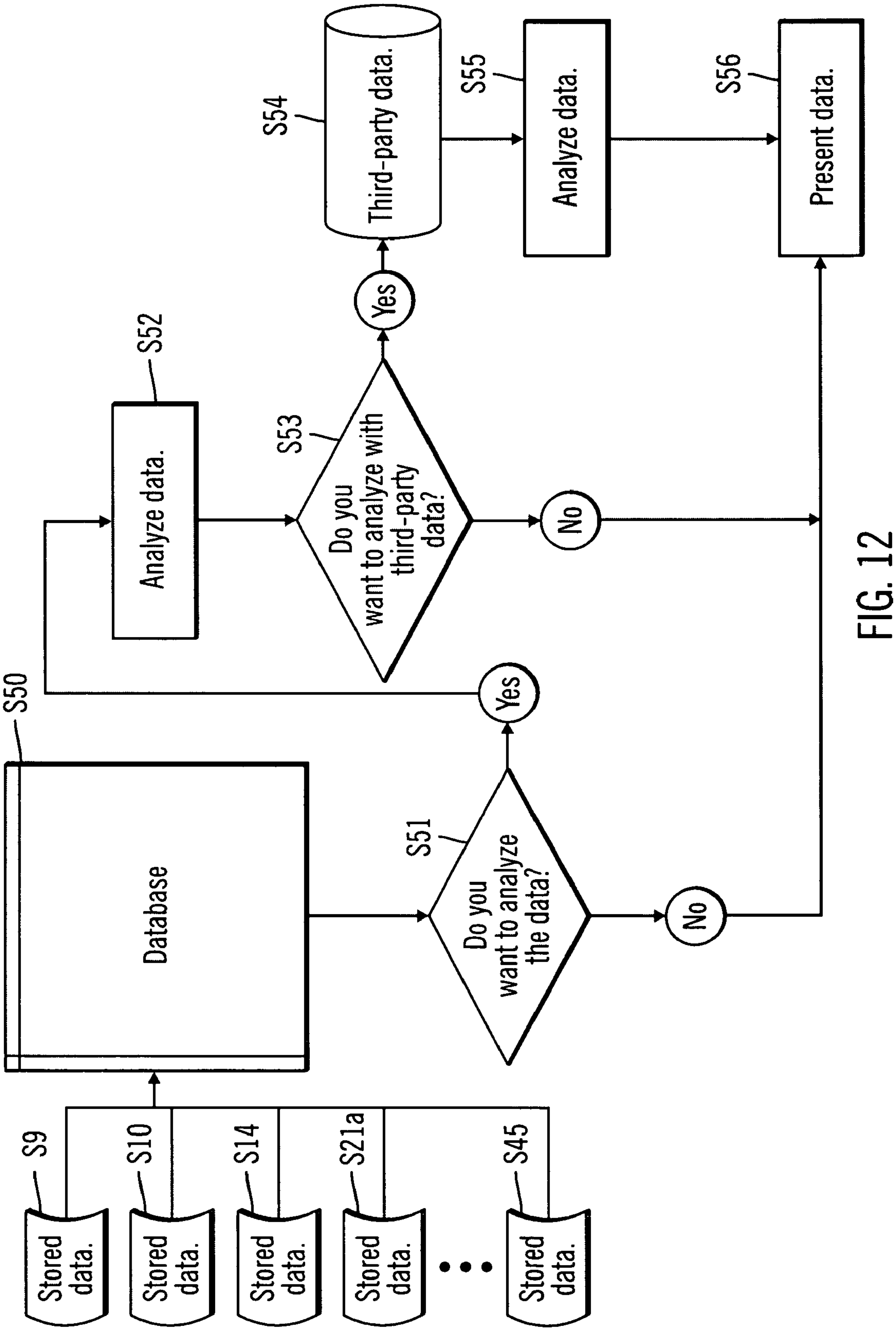
FIG. 12 is a flow chart depicting the process of collecting and analyzing the data generated by users when exploring character-enabled network sites.

With reference to FIG. 12 the data stored at various points throughout the network exploration process (steps S9, S10, S14, S21*a*. . . S45) is compiled in a main database table at step S50. At step S51 outside parties, e. g., character-enabled site proprietors or customers, are given the opportunity to analyze the data. At step S52, the data may be analyzed, using well known market research techniques, including both qualitative and quantitative techniques to develop taste, preference and opinion statistics of users. At step S53, the outside party is given the opportunity to combine the database data with third-party data such as census data and income data. At steps S54 and S55, the data is combined and analyzed. At step S56 the data, either analyzed or unanalyzed, is presented to the outside party.

In accordance with the present invention, the site program/data of a C-E site may be designed to provide a means of capturing data related to the identity, tastes, preferences and opinions of site users. With respect to the identity of a user, by designing pre-profiled characters having a combination of attributes which define a character persona, the system is able to provide a means for determining the demographics of the users visiting a site. For example, if a user selects a pre-profiled character that is female, it is likely that the user is female. As a further example, if the pre-profiled character appears to be a certain age, the selected character is likely to be indicative of the age of the user. Additional character attributes may be indicative of user profession, income, geographic location and ethnicity. It is significant to note that the present invention allows for the determination and collection of user information without asking the user to disclose personal information such as age, gender, name, e-mail address, etc. The user may, however, give more personal information if they choose. For example, the geographic location of a user may be determined if the user chooses to provide his zip code.

With respect to tastes, preferences and opinions, the clothing, accessories, music and other attributes associated with a character identified with by a user are likely to provide an indication of the general tastes, preferences and opinions of that user. Any attribute modifications made by the user provide further insight into the tastes, preferences and opinions of that user. In this respect, the present invention provides a means by which the tastes, preferences and opinions of a portion of the public, i. e. the users of character-enables sites, may be monitored by manufacturers of consumer products. For example, a clothing manufacturer may use the system to test market a new style of shirt. The manufacturer would incorporate animation software and animation data necessary to display a number of shirts of varying styles into an existing character-enabled site or alternatively, establish its own character-enabled site. The number of "hits" each specific shirt style experiences is tallied and stored in the central database 24. Each hit may also be cross referenced to the persona of the character making the hit. Thus the system collects data indicative of the demographics of the users and the styles of shirts favored by the users which fall within a specific demographic. Continuing with the shirt example, additional taste, preference and opinion data may be collected regarding the most popular color for each shirt by providing the user a palette of shirt colors from which to choose.

The foregoing is merely one example of the market research capabilities provided by the present invention. Taste, preference and opinion data may be collected on virtually any consumer product. For example, an automobile manufacturer may test market car options and accessories, a beverage manufacturer may test market a new can design, a cellular telephone manufacturer may gather information on preferred size, shape and color of cell phones. Besides consumer products evaluations, the system of the present invention may be used to conduct opinion surveys on political issues and current events. For example, a user may be presented with animations representative of political figures and asked to choose which character he wants to be. A user may be presented with an animation of a character holding an empty can and asked to choose between dropping the can in the street or into a trash can.

Thus, the system of the present invention provides for the compilation and provision of data about a target audience. The system provides the data necessary to determine market trends in real-time and forecast trends based on the popularity of certain profiles and choices made by users. The system allows for companies to test market products through specific profiles that are programmed into the system to thereby derive marketing answers in real-time. Quick response time to trends is a crucial factor in determining the success of a marketing program. The present invention provides for such a response.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention as defined in the claims.

What is claimed is:

1. A method of collecting marketing data in response to user choices made on-line while interacting with an information network, said method comprising:

a) presenting to a user interface, one or more characters for selection by a user, each of said characters having a unique character persona and being indicative of a user persona;

b) upon selection of a character, presenting in real-time to the user interface, the selected character along with at least one character attribute for selection by said user, each of said character attributes further defining said unique character persona and being further indicative of a user persona;

c) upon selection of a character attribute, presenting in real-time to the user interface, the selected character including the selected character attribute;

d) storing data indicative of said selected character and said selected character attribute;

e) repeating steps a-d at least one additional time for at least one additional user;

f) analyzing said stored data indicative of said selected character and said selected character attribute to develop marketing data that is indicative of user persona.

2. The method of claim 1 wherein step (f) comprises quantitatively analyzing said stored data.

3. The method of claim 1 wherein step (f) comprises qualitatively analyzing said stored data.

4. The method of claim 1 wherein said character, said stored data indicative of said character and said selected character attributes are portable and accompany said user when navigating an information network, said method further comprising:

g) navigating to and interacting with a character-enabled (CE) network site within said information network, wherein said character, said stored data indicative of said selected character and said selected character attribute accompany said user during said interaction with said CE network site, said CE network site being operative for presenting data to said user based on said character, said stored data indicative of said selected character and said selected character attribute;

h) storing additional data indicative of portions of said CE network site visited by said user; and i) analyzing said stored data indicative of said character, said character attributes and said portions of said CE network site visited by said user to develop marketing data that is indicative of said user persona.

5. The method of claim 4 wherein step (i) comprises quantitatively analyzing said stored data.

6. The method of claim 4 wherein step (i) comprises qualitatively analyzing said stored data.

7. The method of claim 4 wherein said stored data indicative of portions of said CE network site includes links selected by said user.

8. The method of claim 1 further comprising combining said stored data with $3^{rd}$ party data.

9. The method of claim 8 further comprising analyzing said combined data.

10. The method of claim 1 wherein said user interface is a handheld communication device.

11. The method of claim 1 further comprising the steps of:

providing a communication link between a plurality of user interfaces that allows a plurality of created characters to be presented on a common CE network site.

12. The method of claim 11 wherein said common CE network site is a chat room.

13. The method of claim 11 wherein said common CE network site is a cell phone network.

14. The method of claim 11 wherein said common CE network site is an instant message network.

15. The method of claim 11 wherein said common CE network site is a virtual environment.

16. The method of claim 11 wherein said user interface is a handheld communication device.

17. A method of collecting marketing data in response to user choices made on-line while interacting with an information network, said method comprising:

a) presenting to a user interface, one or more pre-defined characters for selection by a user, said predefined characters each having a plurality of character attributes that define a unique character persona and are indicative of a user persona;

b) upon selection of one of said pre-defined characters, presenting in real-time to the user interface, the selected character;

c) storing data indicative of said selected pre-defined character;

d) repeating steps a-c at least one additional time for at least one additional user;

e) analyzing said stored data to develop marketing data that is indicative of user persona.

18. The method of claim 17 wherein step (e) comprises quantitatively analyzing said stored data.

19. The method of claim 17 wherein step (e) comprises qualitatively analyzing said stored data.

20. The method of claim 17, wherein said pre-defined character and said stored data indicative of said pre-defined character are portable and accompany said user when navigating an information network, said method further comprising:

f) navigating to and interacting with a character-enabled (CE) network site within said information network wherein said stored data indicative of said pre-defined character accompanies said user during said interaction with said CE network site, said CE network site being operative for presenting data to said user based on said stored data indicative of said pre-defined character;

g) storing additional data indicative of portions of said CE network site visited by said user; and h) analyzing said stored data indicative of said pre-defined character, said character attributes and said portions of said CE network site visited by said user to develop marketing data that is indicative of user persona.

21. The method of claim 20 wherein step (h) comprises quantitatively analyzing said stored data.

22. The method of claim 20 wherein step (h) comprises qualitatively analyzing said stored data.

23. The method of claim 20 wherein said data indicative of portions of said CE network site includes links selected by said user.

24. The method of claim 17 further comprising combining said stored data with $3^{rd}$ party data.

25. The method of claim 24 further comprising analyzing said combined data.

26. The method of claim 17 wherein said user interface is a handheld communication device.

27. The method of claim 17 further comprising the steps of:

providing a communication link between a plurality of user interfaces that allows a plurality of created characters to be presented on a common CE network site.

28. The method of claim 27 wherein said common CE network site is a chat room.

29. The method of claim 27 wherein said common CE network site is a cell phone network.

30. The method of claim 27 wherein said common CE network site is an instant message network.

31. The method of claim 27 wherein said common CE network site is a virtual environment.

32. The method of claim 27 wherein said user interface is a handheld communication device.

33. An interactive online data collection system comprising:

a user interface for accessing an information network;

a database for storing data; and a character enabled (CE) network site within said information network, said CE network site including a processor programmed to:

a) present to said user interface, one or more characters for selection by a user and allow selection of one of said characters, each of said characters having a unique character persona and being indicative of a user persona;

b) upon selection of a character, present in real-time to the user interface, the selected character along with at least one character attribute for selection by said user, said at least one character attribute being further defining said character person and being further indicative of user person;

c) upon selection of a character attribute, present in real-time to the user interface, the selected character including the selected character attribute;

d) store data indicative of said selected character;

e) analyze said stored data indicative of said selected character to develop marketing data that is indicative of user persona.

34. The system of claim 33 wherein said processor is further programmed to:

store data indicative of said selected character and said selected character attribute; and analyze said stored data indicative of said selected character and said selected character attribute to develop marketing data that is indicative of user persona.

35. The system of claim 33 wherein said processor is programmed to quantitatively analyze said stored data.

36. The system of claim 33 wherein said processor is programmed to qualitatively analyze said stored data.

37. The system of claim 33 wherein, said character, said stored data indicative of said character, and said selected character attributes are portable and accompany said user when navigating an information network, said processor being further programmed to:

allow navigation of and interaction with said character-enabled (CE) network site wherein said stored data indicative of said selected character and said selected character attribute accompanies said user during said navigation of said CE network site, said processor being further programmed to present data to said user based on said character, said stored data indicative of said character, and said selected character attribute;

store additional data indicative of portions of said CE network site visited by said user; and analyze said stored data indicative of said character, said character attributes and said portions of said CE network site visited by said user, to develop marketing data that is indicative of a user persona.

38. The system of claim 33 wherein said user interface is a handheld communication device.

39. The system of claim 33 further comprising:

a communication link between a plurality of user interfaces that allows a plurality of created characters to be presented on a common CE network site.

40. The method of claim 39 wherein said common CE network site is a chat room.

41. The method of claim 39 wherein said common CE network site is a cell phone network.

42. The method of claim 39 wherein said common CE network site is an instant message network.

43. The method of claim 39 wherein said common CE network site is a virtual environment.

44. The method of claim 39 wherein said user interface is a handheld communication device.

45. A method of performing surveys by presenting users with choices while interacting with an information network, said method comprising:

a) presenting to a user interface, at least one character, said at least one character having a unique character persona;

b) presenting to a user interface, a plurality of character actions representative of different positions on an issue, each of said character actions further defining said unique character persona and being indicative of user persona;

c) asking the user to select an action that represents the users position on said issue;

d) storing data indicative of said selected action;

e) repeating steps a-d at least one additional time for at least one additional user; and f) analyzing said stored data indicative of said selected action to determine survey data that is indicative of user persona.

46. The method of claim 45 wherein step (e) comprises quantitatively analyzing said stored data.

47. The method of claim 45 wherein step (e) comprises qualitatively analyzing said stored data.

48. The method of claim 45 further comprising combining said stored data with $3^{rd}$ party data.

49. The method of claim 48 further comprising analyzing said combined data.

* * * * *